United States Patent
Kull et al.

(10) Patent No.: US 6,300,896 B1
(45) Date of Patent: Oct. 9, 2001

(54) USE OF A DEVICE IN A VEHICLE, USING WHICH THE ENVIRONMENT OF THE VEHICLE CAN BE IDENTIFIED BY MEANS OF RADAR BEAMS

(75) Inventors: Wolfgang Kull, Neuhausen; Wolfgang Lauer, Heilbronn; Thomas Reichmann, Donzdorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/465,595

(22) Filed: Dec. 17, 1999

(30) Foreign Application Priority Data

Dec. 17, 1998 (DE) .............................. 198 58 298

(51) Int. Cl.⁷ ...................................... G01S 13/58
(52) U.S. Cl. ............................................ 342/104
(58) Field of Search .................... 342/104; 702/96; 701/1, 82, 91; 180/197

(56) References Cited

U.S. PATENT DOCUMENTS

| | | |
|---|---|---|
| 4,335,382 | 6/1982 | Brown et al. . |
| 4,518,044 | 5/1985 | Wiegardt et al. . |
| 4,703,429 | 10/1987 | Sakata . |
| 5,020,008 | 5/1991 | Chambers et al. . |
| 5,320,186 | 6/1994 | Strosser et al. . |
| 5,479,811 | 1/1996 | Baumann et al. . |
| 5,691,724 | * 11/1997 | Aker et al. ............................. 342/104 |
| 6,148,269 | * 11/2000 | Kumar et al. ........................... 702/96 |

FOREIGN PATENT DOCUMENTS

| | | |
|---|---|---|
| 2623643 | 12/1977 | (DE) . |
| 37 39 2 71 A 1 | 11/1987 | (DE) . |
| 12967/1998 | 1/1988 | (JP) . |

* cited by examiner

Primary Examiner—Daniel T. Pihulic
(74) Attorney, Agent, or Firm—Crowell & Moring LLP

(57) ABSTRACT

The present invention relates to a method for correction of a signal which is derived from wheel rotation speed signals and represents the vehicle speed, wherein the vehicle has a device by means of which the environment of the vehicle can be identified, and wherein the correction of the signal which is derived from the wheel rotation speeds and represents the vehicle speed is carried out on the basis of the speed at which objects in the environment which are identified as being stationary move relative to the vehicle.

9 Claims, 1 Drawing Sheet

USE OF A DEVICE IN A VEHICLE, USING WHICH THE ENVIRONMENT OF THE VEHICLE CAN BE IDENTIFIED BY MEANS OF RADAR BEAMS

The present invention relates to the use of a device in a vehicle, using which the environment of the vehicle can be identified by means of radar beams, in which case objects in the environment are distinguished on the basis of whether they are moving or stationary.

Methods of this type are known in which one wheel is selected as the reference wheel, with compensation factors being determined for the other wheels of the vehicle when the vehicle is driven in a straight line without being accelerated or braked. This makes it possible to compensate for differences in the wheel diameters of the vehicle wheels. Instead of a reference wheel, it is also possible to use an averaged value for the rotation speeds of a plurality, for example all, of the wheels. This makes it possible to avoid all the wheel rotation speeds differing when only the wheel diameter of the reference wheel is different. Such differences may result, for example, from air pressure fluctuations in the vehicle wheels, and from profile wear.

SUMMARY OF THE INVENTION

The present invention is based on the problem of providing an improved value for the wheel rotation speed and the vehicle speed.

According to the present invention, this object is intended to be achieved by the use of a device in a vehicle, using which the environment of the vehicle can be identified by means of radar beams, in which case objects in the environment are distinguished on the basis of whether they are moving or stationary, in that a signal which is derived from wheel rotation speed signals and represents the vehicle speed is corrected on the basis of the speed at which objects in the environment which are identified as being stationary move relative to the vehicle.

In this case, it is advantageously also possible to compensate for differences in the determination of the vehicle speed which occur for example, when the tires of all four wheels are replaced. When such a tire change is carried out, a change in the tire type may result in the wheel radius changing considerably, in the range of several percent. In tie same way, while the vehicle is being operated, the tire may chance its circumference as a result of heating during operation. In the event of a chance in the profile depth of the tires due to wear and in the event of a change in the influences already mentioned, the prior art furthermore results in a systematic error occurring, since the change relates to the reference wheel to the same extent as to the other vehicle wheels.

This can therefore advantageously avoid systematic errors resulting from effects which affect all the wheels, and can thus also lead to a change in the reference speed.

With regard to the present invention, it has been found to be particularly advantageous that a device, which is present in a vehicle in any case can advantageously be used to identify the environment by means of radar beams, in order to correct the value of the wheel rotation speed and the vehicle speed. For example, such devices for radar detection are known in systems in which the vehicle speed of the vehicle is intended to be set and, possibly adapted, automatically. In known Tempomat systems, the vehicle speed is set to a predetermined value. When the brakes are operated, the Tempomat is switched off, and the vehicle is driven once again by the vehicle driver. Since increasing traffic density makes it necessary to operate the brakes relatively frequently, the Tempomat is thus switched off relatively frequently. For this reason, devices are known in which a maximum speed is predetermined, but in which the maximum speed is reduced when this is necessary owing to there being slower vehicles in front. The speed is then matched to the speed of the vehicle in front, in order to regulate the vehicle speed to congested traffic. It is advantageous to use radar beams to detect the speed of the vehicles in front. This device, which operates using radar beams, thus controls the vehicle speed during operation.

This further use of this known device according to the invention for adjustment of the signal which represents the vehicle speed thus allows the adjustment to be carried out with little complexity in terms of sensors. It is particularly advantageous in this case that an accurate signal of the vehicle speed is nevertheless available since the device must take account of the safety aspect of such speed control.

In another aspect of the invention, objects are identified as being stationary whose determined relative speed with respect to the vehicle differs by not more than a specific amount from the vehicle speed derived from the wheel rotation speed signals.

In another aspect of the invention, the specific amount is defined as a function of the vehicle speed in such a manner that the specific amount increases as the vehicle speed increases.

A maximum error in the wheel radius, which may occur as a result of a tire chance when a different tire type is fitted, can be determined on the basis of the tire types approved for a vehicle, the influences of the speed of travel and the centrifugal forces on the tire resulting from this, the change in the wheel radius resulting from heating of the tire, the chance in the dynamic wheel radius due to deformation of the tire when travelling slowly, the influences of the reduction in the profile height, and the influences of changes in the tire air pressure. It is advantageous to choose as the predetermined amount a value which is dependent on the order of magnitude of this maximum error. Since the absolute error in the vehicle speed becomes greater with the change in the wheel radius as the vehicle speed increases, the predetermined amount may increase as the vehicle speed increases. However, it is also possible to determine a maximum speed error on the basis of the change in the wheel radius, and to define the predetermined amount accordingly.

In another aspect of the invention, the wheel rotation speed signals are corrected by multiplying the wheel rotation speed signals by a correction factor.

This allows the correction to be carried out easily.

In another aspect of the invention, the correction factor is determined by averaging quotients of the relative speed of objects which are identified as being stationary, with respect to the vehicle speed derived from the wheel rotation speed signals.

This averaging advantageously compensates for the influences of individual incorrect measurements, so that these have only a reduced effect on the correction factor.

In another aspect of the invention, the only quotients which are included in the averaging are those for which the vehicle speed is greater than a specific minimum speed.

At excessively slow vehicle speeds, the determination of the vehicle speed itself as well as the determination of the relative speed are subject to large errors. An order of magnitude for the specific minimum speed may be, for example, about 30–60 km/h.

In another aspect of the invention, the only quotients included in the averaging are those which are determined at times at which the vehicle acceleration or vehicle deceleration which can be derived from the wheel rotation speed signals is within predetermined limits.

In order to determine the correction factors, it is advantageous for the vehicle movement to be uniform, that is to say, in particular, without any acceleration. Thus, since the limits for vehicle acceleration and vehicle deceleration are predetermined, it is possible to avoid the averaging including measurement data which was recorded in conditions which would result in incorrect correction factors. Furthermore, this limitation allows any measurement errors or computation errors to be identified. Specifically, if the determined vehicle accelerations or vehicle decelerations exceed the maximum values which can be predetermined for this vehicle, it is possible to assume a measurement error or computation error. In this case, the further processing of measured data is advantageously inhibited, for example for 50 program cycles.

In another aspect of the invention, the only quotients included in the averaging are those which are determined at times at which the angle between the vehicle's direction of travel and the vector from the vehicle to the object which is identified as being stationary does not exceed a specific value.

Since the relative speed between the vehicle and the object which is identified as being stationary is the projection of the vehicle speed in the direction of the object, the correction factors can be determined with as little error as possible only if the vehicle is travelling at least approximately towards the object. Specifically, this ensures that the projection of the vehicle speed in the direction of the object and the vehicle speed virtually completely match, since the angle between the vehicle speed and the direction of the object viewed from the vehicle is very small.

In another aspect of the invention, the only quotients included in the averaging are those which are determined at times at which the radius of curvature of a curve on which the vehicle is travelling is not less than specific values as a function of the distance to the object which is identified as being stationary.

This once again advantageously avoids correction factors being determined when the movement direction of the vehicle relative to the object is changing. This can lead to errors for the reasons explained. In the same way, errors can result if the correction factors are determined while cornering since, by virtue of the design, the wheels on the inside of the curve rotate at a lower speed than the wheels on the outside of the curve.

In another aspect of the invention, when determining the correction factor, the relative speed of objects which are identified as being stationary is related to the vehicle speed derived from the wheel rotation speed signals, with this vehicle speed being corrected by the previously determined correction factor.

In this case, it is assumed that the previous correction factor is in the correct order of magnitude, but may need to be adapted. Previous determined correction factors are advantageously considered in this process, with an appropriate weighting. This process advantageously allows the correction factors to be adapted as a result of a chance in the profile depth due to tire wear. The step-by-step adaptation in this process also allows the detection window to be gradually reduced in size, in the sense of reducing the specific amount with regard to the vehicle speed within which targets are identified as being stationary which are moving within this amount about the current vehicle speed. Thus, when determining the correction factors, it is possible to gradually eliminate those targets which are identified as being stationary even though they are moving at a speed—although this is slow.

In another aspect of the invention, when determining the correction factors, the relative speed of objects which are identified as being stationary is related to the vehicle speed which is derived directly from the wheel rotation speed signals.

Any change required to the correction factors can then be carried out particularly quickly. This has been found to be advantageous, for example, when changes are required owing to wheels having been replaced. Furthermore, this process allows better long-term analysis, since information relating to previous states is not lost.

In another aspect of the invention, when determining the correction factors, a new correction factor is stored only if the new correction factor differs from the previous correction factor by more than a predetermined difference.

This allows short-term chances to be compensated for, occurring, for example, as a result of individual measurement errors (which are not excessively large). Furthermore, this makes it possible to take account of the fact that an EEPROM for storing the correction factors allows only a limited number of storage processes. Thus, since the number of storage processes and overwriting processes is reduced, the life of the EEPROM is extended. The criterion may be formed, for example, first of all by multiplying the magnitude of the difference between the cold correction factor and the new correction factor by 150. If the magnitude of this parameter is greater than 1, the new correction factor is stored.

In another aspect of the invention, a set of correction factors for the individual wheel rotation speed signals is in each case formed for various speed ranges.

The change in the dynamic circumference when moving slowly, in particular, has a greatly different effect at different vehicle speeds, and correspondingly leads to different changes in the dynamic wheel radius. For example, an interval width of 20 km/h can advantageously be chosen for the subdivision of vehicle speed intervals. This advantageously allows changes in the dynamic wheel radius to be compensated for. However, such subdivision involves a correspondingly high level of processing complexity and a large memory requirement. Even greater interval widths may thus be chosen. For example, if subdivided into two intervals, the first interval may extend up to a vehicle speed of about 130 km/h, while the second interval is above 130 km/h.

BRIEF DESCRIPTION OF THE DRAWINGS

An exemplary embodiment of the invention is shown in more detail in the drawing. The single.

DETAILED DESCRIPTION

Figure 1:
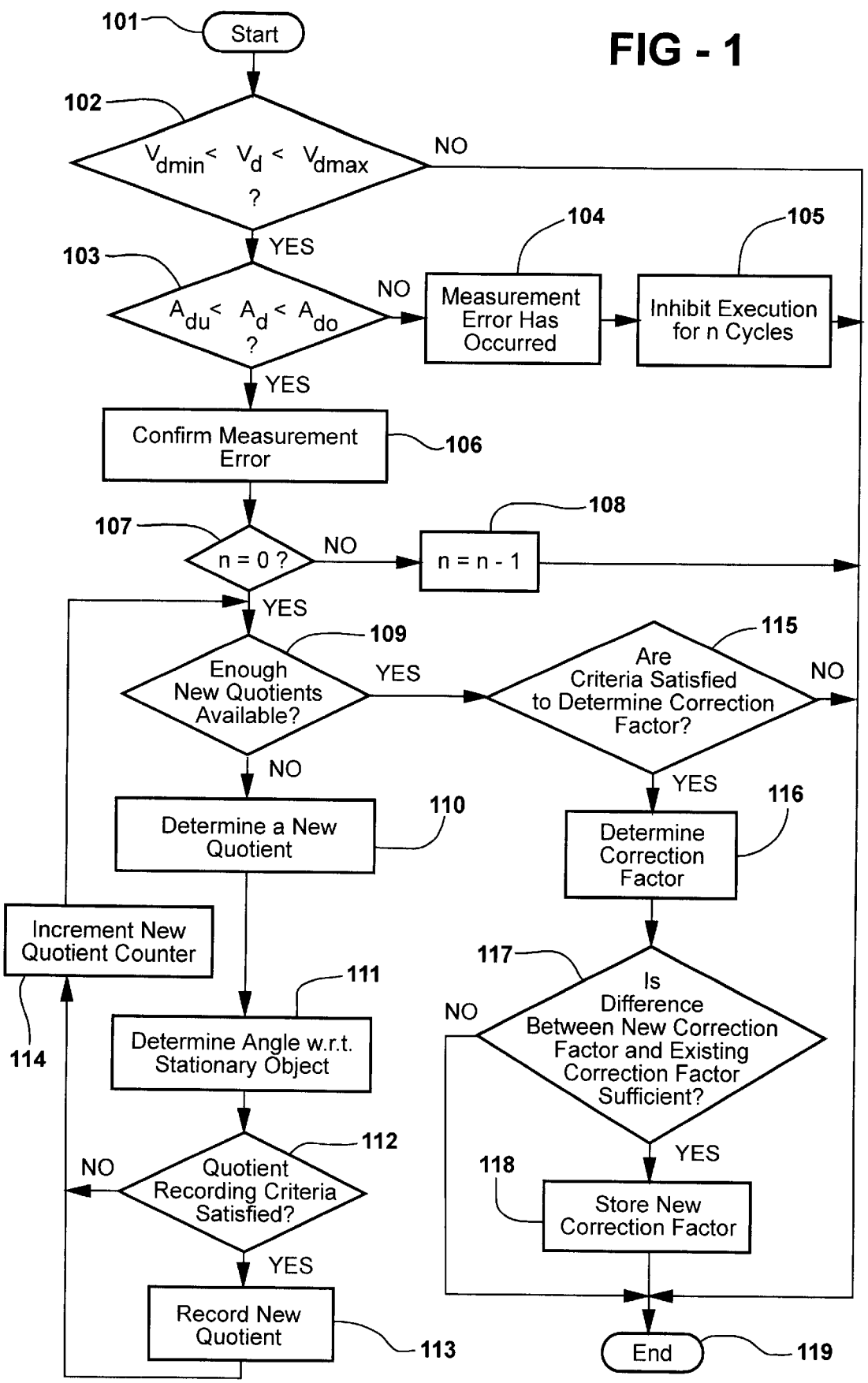
FIG. 1, shows a flowchart of an exemplary embodiment of the method which is based on the use according to the invention of the device.

The program is started in step 101. This start is initiated by a central control module which starts the program at cyclic intervals, for example every 50 ms.

A check is carried out in step 102 to determine whether the vehicle speed is within a speed range in which correction factors are determined. For example, a minimum speed which may be between about 30 to 60 km/h may be predetermined for the determination of the correction factors.

If this is not the case, the program moves to step 119, in which the running of the program is ended.

Otherwise, the program moves to step 103, in which the vehicle acceleration or vehicle deceleration calculated from the wheel rotation speeds is monitored for specific thresholds being overshot or undershot. The vehicle has a maximum acceleration as well as a maximum deceleration. If these values are exceeded owing to the values calculated from the wheel rotation speeds, it can then be concluded that a measurement error or a computation error has occurred.

Thus, if it has been found in step 103 that the vehicle acceleration or vehicle deceleration calculated from the wheel rotation speeds is not within a specific vehicle acceleration or vehicle deceleration band, step 104 confirms that a measurement error or computation error has obviously occurred. In order to allow the system to restabilize, step 105 inhibits future program runs for a specific number of program cycles, for example 50 program cycles. This is done by setting a flag to the value 50. This flag is evaluated once again in steps 107 and 108.

If it was found in step 103 that the vehicle acceleration or vehicle deceleration calculated from the wheel rotation speeds is within the specific band, the program moves to step 106, which confirms whether any measurement or computation error is present.

A check is carried out in step 107 to determine whether the flag which may have been set in step 105 has the value 0. If this is not the case, the program moves to step 108, in which this flag is decremented by the value 1. After step 108, the program moves to step 119, in which the program run is ended. Thus, if the flag has been set in step 105, this flag is reduced by the value 1 in each of the following 50 program runs, without any correction factors being determined. After 50 program runs, the flag value 0, and the further processing is carried out from this point again, in step 109.

A check is carried out in step 109 to determine whether at least 20 new quotients have been determined since the correction factors were last calculated.

If this is not yet the case, the program moves to step 110, in which the quotient of the relative speed of an object which is identified as being stationary and the vehicle speed determined from the wheel rotation speeds is determined.

The angle between the vectors of the vehicle speed and the relative speed with respect to the object which is identified as being stationary is determined in step 111.

A check is carried out in step 112 to determine whether the recording criteria are satisfied for recording the corresponding quotient in the distribution for calculation of the correction factors. These criteria are formed, for example, in that the angle between the vehicle speed and the relative speed with respect to the object which is identified as being stationary must not be excessive.

If the check in step 112 showed that the criteria are satisfied, the program moves to step 113, in which the quotient is recorded in the distribution. It is advantageous to subdivide the distribution into specific speed ranges. The quotient is thus recorded in the distribution for this speed range.

Step 114 counts how many quotients have been determined.

If the check in step 109 showed that 20 quotients had been determined, the program moves to step 115, in which a check is carried out to determine whether the criteria are satisfied on the basis of which correction factors can sensibly be determined from the determined distribution. In order to allow any measurement errors to be compensated for statistically, it is necessary to have a sufficient number of support points for averaging available. It has been found to be suitable to have 30,000 support points for averaging. Furthermore, it is experience to evaluate the gradient of the flanks of the distribution relating to the mean values. If these flanks are sufficiently steep, it can also be assumed from this that the mean value can be determined such that the correct relationships are in consequence reflected correctly.

If these criteria are satisfied, the program moves to step 116, in which the correction factors are determined for the corresponding speed range.

In particular in order to protect the EEPROM in which the correction factors are stored, a check is carried out in step 117 to determine whether it has been possible to find any change in the corresponding correction factor greater than a specific threshold value. If this is the case, the corresponding correction factor is stored, in step 118.

The program run is then ended, corresponding to step 119.

What is claimed is:

1. A method for correcting a signal representing speed of a vehicle comprising the steps of:

(1) deriving a signal from vehicle wheel rotation speed signals, the signal representing speed of the vehicle;

(2) identifying an environment of the vehicle by means of radar beams wherein objects in the environment are distinguished and characterized as moving or stationary, where an object is characterized as being stationary when its relative speed with respect to the vehicle differs by not more than a specific amount from the vehicle speed derived from the wheel rotation signals, said specific amount being defined as a function of the vehicle speed in such a manner that the specific amount increases as the vehicle speed increases; and (3) generating a correction of the vehicle speed signal as a function of speed at which the objects characterized as stationary, move relative to the vehicle.

2. A method for correcting a signal representing speed of a vehicle comprising the steps of:

(1) deriving a signal from vehicle wheel rotation speed signals, the signal representing speed of the vehicle;

(2) identifying an environment of the vehicle by means of radar beams wherein objects in the environment are distinguished and characterized as moving or stationary;

(3) determining a correction factor by averaging quotients of relative speeds of objects which are identified as being stationary, with respect to the vehicle speed derived from the wheel rotation speed signals; and (4) generating a corrected vehicle speed as a function of speed at which the objects characterized as stationary, move relative to the vehicle, said corrected vehicle speed being obtained by multiplying the wheel rotation speed signals by said correction factor.

3. The method according to claim 2, wherein the only quotients which are included in the averaging are those for which the vehicle speed is greater than a specific minimum speed.

4. The method according to claim 2, wherein the only quotients included in the averaging are those which are determined at times at which the vehicle acceleration or vehicle deceleration which can be derived from the wheel rotation speed signals is within predetermined limits.

5. The method according to claim 2, wherein the only quotients included in the averaging are those which are determined at times at which an angle between the vehicle's direction of travel and a vector from the vehicle to the object which is identified as being stationary does not exceed a specific value.

6. The method according to claim 2, wherein the only quotients included in the averaging are those which are determined at times at which a radius of curvature of a curve on which the vehicle is travelling is not less than specific values as a function of a distance to the object which is identified as being stationary.

7. A method for correcting a signal representing speed of a vehicle comprising the steps of:
  (1) deriving a signal from vehicle wheel rotation speed signals, the signal representing speed of the vehicle;
  (2) identifying an environment of the vehicle by means of radar beams wherein objects in the environment are distinguished and characterized as moving or stationary; and
  (3) generating a correction of the vehicle speed signal as a function of speed at which the objects characterized as stationary, move relative to the vehicle speed, said vehicle speed being corrected by a previously determined correction.

8. A method for correcting a signal representing speed of a vehicle comprising the steps of:
  (1) deriving a signal from vehicle wheel rotation speed signals, the signal representing speed of the vehicle;
  (2) identifying an environment of the vehicle by means of radar beams wherein objects in the environment are distinguished and characterized as moving or stationary, where an object is characterized as being stationary when its relative speed with respect to the vehicle differs by not more than a specific amount from the vehicle speed derived from the wheel rotation signals, said specific amount being defined as a function of the vehicle speed in such a manner that the specific amount increases as the vehicle speed increases;
  (3) generating a correction of the vehicle speed signal as a function of speed at which the objects characterized as stationary, move relative to the vehicle; and
  (4) storing said new correction only if said new correction differs from a previous correction by more than a predetermined difference.

9. A method for correcting a signal representing speed of a vehicle comprising the steps of:
  (1) deriving a signal from vehicle wheel rotation speed signals, the signal representing speed of the vehicle;
  (2) identifying an environment of the vehicle by means of radar beams wherein objects in the environment are distinguished and characterized as moving or stationary;
  (3) for each of various speed ranges generating a set of corrections for the vehicle wheel rotation speed signals, where each set of corrections is a function of speed at which objects characterized as stationary, move relative to the vehicle; and
  (4) for a given speed range generating a corrected vehicle wheel rotation speed for each wheel by multiplying a wheel rotation speed by an element of said set of corrections.

* * * * *